(No Model.)
J. HORROCKS.
WIRE FENCING PICKET.
No. 351,109. Patented Oct. 19, 1886.
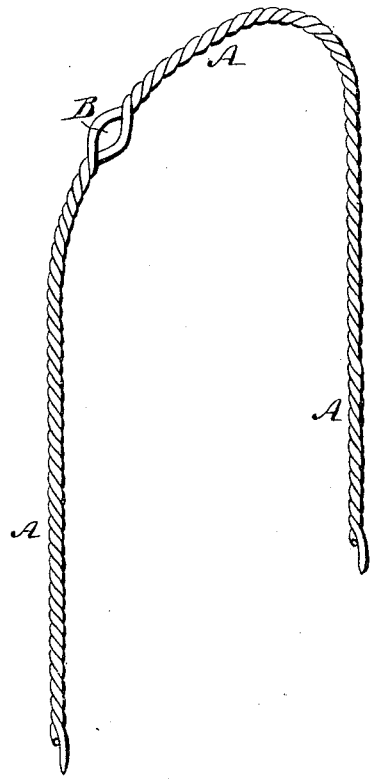
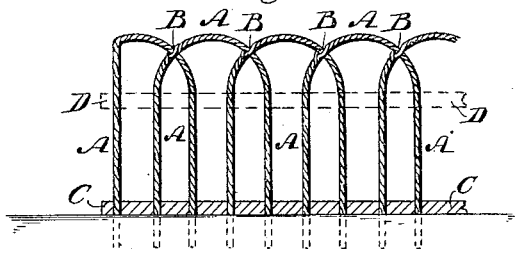
WITNESSES:
INVENTOR: J. Horrocks
BY Munn & Co.
ATTORNEYS.

UNITED STATES PATENT OFFICE.

JOSHUA HORROCKS, OF BROOKLYN, NEW YORK.

WIRE FENCING-PICKET.

SPECIFICATION forming part of Letters Patent No. 351,109, dated October 19, 1886.

Application filed April 6, 1886. Serial No. 197,956. (No model.)

*To all whom it may concern:*

Be it known that I, JOSHUA HORROCKS, of Brooklyn, in the county of Kings and State of New York, have invented certain new and useful Improvements in Self-Locking Twisted-Wire Fencing-Pickets, of which the following is a full, clear, and exact description.

Reference is to be had to the accompanying drawings, forming part of this specification, in which similar letters of reference indicate corresponding parts in both the figures.

Figure 1 is a perspective view of one of my improved pickets enlarged. Fig. 2 is a side elevation of a section of fence formed with my improved pickets.

The object of this invention is to provide self-locking twisted-wire fencing-pickets, designed especially for forming border railings for lawn and garden walks, but which may be used with advantage for forming fences for various other purposes.

The invention consists in the construction of the pickets, and in their combination with each other in forming a fence, as will be hereinafter fully described.

A represents the pickets, which are formed of two or more strands of wire twisted together.

The pickets A are made in U shape, and have eyes B, one to each, formed in them in the side parts of their bends. The eye B of each picket is made of sufficient size to receive an arm of the adjacent picket, and is formed by spreading the strands of the wires at the desired point.

The pickets A can be made of any desired height, as the purpose for which the railing or fence is to be used may require.

In setting up the railing or fence, an end picket is set in the ground, with the arm having the eye B forward. The next picket is then arranged with the arm having the eye forward. Its rear arm is passed through the eye of the first picket, and its ends are forced into the ground, and so on until the desired length of railing or fence has been formed.

The end pickets are made of a less width than the others, and with the straight part of their outer arms longer than that of the inner arms, as shown in Fig. 2, so that all the arms of all the pickets in the railing or fence will be at a uniform distance apart, as shown in Fig. 2.

The ends of the pickets can be set in the ground, as shown in Fig. 2, or they can be passed through a base-bar, C, before entering the ground, as indicated in full lines in Fig. 2, to strengthen them in place.

In case the pickets A are made high, they can be further strengthened in place by passing their arms through a bar, D, and securing the said bar to the upper parts of the said arms, as indicated in dotted lines in Fig. 2.

Having thus described my invention, what I claim as new, and desire to secure by Letters Patent, is—

1. The herein-described picket A, consisting of two or more strands of wire twisted together and bent into U shape, and provided with the eye B in its bend at one side of the center thereof, as and for the purpose specified.

2. The combination, in a fence, of a series of U-shaped pickets, A, provided with eyes B at one side of the center of their bends, each picket receiving through its eye the arm of the picket adjacent to said eye, and having its opposite arm passed through the eye of the adjacent picket on the opposite side, substantially as herein shown and described.

JOSHUA HORROCKS.

Witnesses:
 JAMES T. GRAHAM,
 C. SEDGWICK.